(12) United States Patent
Berg

(10) Patent No.: US 11,130,100 B1
(45) Date of Patent: Sep. 28, 2021

(54) AERATING EDUCTOR DEVICE

(71) Applicant: Jacob H. Berg, Fort Myers, FL (US)

(72) Inventor: Jacob H. Berg, Fort Myers, FL (US)

( * ) Notice: Subject to any disclaimer, the term of this patent is extended or adjusted under 35 U.S.C. 154(b) by 0 days.

(21) Appl. No.: 17/110,463

(22) Filed: Dec. 3, 2020

Related U.S. Application Data

(60) Provisional application No. 63/042,320, filed on Jun. 22, 2020.

(51) Int. Cl.
*B01F 5/04* (2006.01)
*A01K 63/04* (2006.01)
*B01F 3/04* (2006.01)
*F15D 1/02* (2006.01)

(52) U.S. Cl.
CPC ............ *B01F 5/043* (2013.01); *A01K 63/042* (2013.01); *B01F 3/0446* (2013.01); *B01F 2003/04872* (2013.01); *B01F 2005/0448* (2013.01); *B01F 2215/0052* (2013.01); *F15D 1/025* (2013.01)

(58) Field of Classification Search
CPC ..... A01K 63/042; B01F 3/0446; B01F 5/043; B01F 2003/04872; B01F 2005/044; B01F 2005/0448; B01F 2215/0052; F15D 1/025
USPC .............. 137/891; 261/76, DIG. 56, DIG. 75
See application file for complete search history.

(56) References Cited

U.S. PATENT DOCUMENTS

| | | | | | |
|---|---|---|---|---|---|
| 1,455,069 A | * | 5/1923 | Bluemel | ..................... | F23K 5/10 261/64.1 |
| 1,583,303 A | * | 5/1926 | Mertz | ....................... | F02M 1/00 261/53 |
| 2,887,275 A | * | 5/1959 | Dixon, Jr. | ............. | B01F 5/0408 239/427 |
| 3,007,609 A | * | 11/1961 | Pascucci | ............... | A47J 31/401 222/129.2 |
| 3,357,598 A | * | 12/1967 | Kraft | ..................... | B67D 1/0045 222/134 |
| 3,640,516 A | * | 2/1972 | Willinger | ............. | A01K 63/042 261/121.2 |
| 3,643,688 A | * | 2/1972 | Meinert | ............... | G05D 11/006 137/556 |
| 3,711,068 A | * | 1/1973 | Perry | ..................... | F02M 19/00 261/41.4 |
| 3,848,858 A | * | 11/1974 | Page | ........................ | F02M 7/12 261/63 |
| 4,817,825 A | * | 4/1989 | Freese | .................. | B67D 1/0045 222/129.2 |
| 6,282,903 B1 | * | 9/2001 | Russell | ..................... | F01K 9/00 60/659 |

(Continued)

*Primary Examiner* — Charles S Bushey
(74) *Attorney, Agent, or Firm* — William E. Noonan

(57) ABSTRACT

An eductor includes an adjustable air inductor assembly connected to a source of outside air or other fluid. As liquid flows through a constricted orifice of the eductor, the venturi effect creates a vacuum or low pressure zone that draws inducting fluid through the inductor assembly and infuses such fluid into the liquid driven or transmitted through the eductor. The fluid inducted liquid is then discharged by the eductor into a body or contained volume of water. Improved aeration and fluid flow control, as well as reduced algae growth are achieved without extraneous mechanical equipment. Increased turbulent liquid flow is produced, for example, to more effectively clean dirt and debris from water recirculating swimming pools, fish tanks and similar environments.

16 Claims, 3 Drawing Sheets

(56) References Cited

U.S. PATENT DOCUMENTS

| | | | | |
|---|---|---|---|---|
| 7,416,326 B2* | 8/2008 | Sakata | ............ | A61L 2/18 |
| | | | | 137/889 |
| 9,061,256 B2* | 6/2015 | Mori | ............ | B01F 3/04113 |
| 9,370,784 B2* | 6/2016 | Katou | ............ | B05B 1/18 |
| 9,862,590 B2* | 1/2018 | Chung | ............ | B67D 1/10 |
| 2016/0354732 A1* | 12/2016 | Mok | ............ | B01F 5/0428 |

\* cited by examiner

AERATING EDUCTOR DEVICE

RELATED APPLICATION

This application claims the benefit of U.S. Provisional Application Ser. No. 63/042,320 filed Jun. 22, 2020.

FIELD OF THE INVENTION

This invention relates to an eductor device and, more particularly, to an eductor that utilizes an adjustable air induction system for effectively entraining a selected amount of air into water or other liquid transmitted through the eductor such that the fluid is more effectively aerated and/or flows with increased turbulence.

BACKGROUND OF THE INVENTION

Various bodies of water require regular aeration or oxygenation. For example, fish tanks, aquariums, lakes and ponds typically must be aerated to maintain oxygen levels necessary to support fish or other marine life. Aeration or oxygenation may also be needed to prevent the buildup of algae in ponds, lakes and potable water supplies.

Conventionally, a body or contained volume of water is aerated by pumping air beneath the surface of the water. This produces bubbles that rise to the surface and allow for partial absorption of the pumped air by the water. In potable water supplies, aerating sprayers are frequently utilized to increase the oxygen level of the water. Virtually all existing aeration techniques require the use of pumps and motors, which, in turn, require a power supply. In addition, piping, sprayers and other mechanical equipment are often used. Such equipment can be costly and usually requires constant upkeep, maintenance and replacement. Moreover, it can be difficult to finetune or adjust the precise amount of oxygen required to properly support a specific marine environment or to effectively inhibit algae growth.

Generating or maintaining the flow or movement of water or other liquid through a tank, aquarium or other contained body of water is also important for a number of reasons. In a fish tank or aquarium such movement may provide and enhance the feeling of a natural habitat for fish or other marine life, especially when plants or foliage are included in the tank. Improved water flow also helps to improve gas exchange (carbon dioxide/oxygen), disperses food or chemicals throughout the water and improves the rate of gas exchange between carbon dioxide and dissolved oxygen. Liquid movement may be used to replicate varying currents and to provide different temperature zones within a tank, aquarium or other container. Currently, the need exists for technology that provides a more effective and improved flow of water in an aquatic setting that accommodates marine life.

Swimming pools and spas are another environment where large volumes of water are accommodated. This water must be moved regularly and not allowed to stagnate, which can contribute to the growth of algae due to lack of oxygen. Typically, the water is recirculated through the pool or spa in order to filter dirt, debris and vegetation. The recirculatory flow also assists disbursing the standard pool chemicals to combat algae. Nonetheless, conventional pool eductors designed to increase water flow and turbulence are often inadequate and, by themselves, do not completely and effectively keep the pool clean. As a result, the pool owner must periodically exert extra, undue time, labor and expense to brush and vacuum the floor and sides of the pool in order to maintain the water in a clear and clean condition.

Indoor swimming pools can exhibit undue algae grown due to limited exposure to sunlight and insufficient oxygen in the water. This in turn contributes to solids, which can plug the pool filter thereby inhibiting the ability of the pool's pump to push the solids to the recirculating drain of the pool. On the other hand, outdoor swimming pools often attract pollen, dust, leaves and other debris that can reduce the effectiveness and service life of the pool's filter system. Such debris also requires more frequent servicing and maintenance to keep the pool clean. Swimming pools that employ pool heaters and similar equipment tend to exhibit a water recirculating flow that has a diminished force, which cleans and oxygenates the water much less effectively. Currently, a significant need exists for a device that effectively addresses the foregoing problems exhibited by conventional swimming pool recirculation systems.

SUMMARY OF THE INVENTION

It is therefore an object of the present invention to provide an eductor device featuring an air induction system that simply, yet effectively inducts or entrains a selected amount of air into a flow of water so that the water is properly aerated to support fish and other marine life in a tank or aquarium, and to inhibit algae growth in a water storage tank, swimming pool or other body of water.

It is a further object of this invention to provide an air induction system for an eductor, which eliminates or at least greatly reduces the need for extraneous pumps, pipes, sprayers and other mechanical equipment conventionally used to aerate a body of water.

It is a further object of this invention to provide a system for effectively aerating or oxygenating a body of water that is far simpler, less costly and easier to adjust and maintain than conventional water aeration systems.

It is a further object of this invention to provide an aerating eductor with adjustable air induction for producing a more turbulent liquid flow that can be used to effectively clean swimming pools, spas and similar bodies of water by more forcefully dislodging debris from the sides and bottoms of the pool and directing that debris to the pool return for removal by the pool's filter.

It is a further object of this invention to provide an eductor having an air induction system that may be simply and quickly adjusted to produce a desired amount of aeration or oxygenation for the body of water involved.

It is a further object of this invention to provide an aeration eductor that helps to generate improved diverse and effective types of liquid flow in various water environments including but not limited to aquariums, marine tanks, lakes, ponds, water storage tanks and swimming pools.

It is a further object of this invention to provide an aerating eductor that substantially improves recirculating flow in swimming pools and which reduces the labor, time and expense required to clean and maintain a pool.

It is a further object of this invention to provide and aerating eductor for a swimming pool that provides for improved, uniform temperature control and better chemical disbursement in restricted areas of a pool such as steps and corners.

This invention results from a realization that both improved aerating and increased water turbulence may be achieved by providing an eductor with an adjustable air inductor that allows a selected amount of outside air to be entrained and absorbed by water or other fluid flowing through the eductor. This enables the eductor to operate effectively both in environments where increased oxygen is required to support fish or marine life and where increased aeration is needed to inhibit algae growth. The increased turbulence provided by the system also allows the surface, walls and floor of swimming pools, spas and similar environments to be more effectively cleaned by the turbulent flow produced by the eductor. The aerating eductor also produces assorted types of liquid flow in various environments.

This invention features an aerating eductor having an eductor housing that includes an inlet for introducing liquid into the eductor housing and an enlarged discharge outlet that is wider than the inlet for discharging fluid from the eductor housing. A venturi eductor nozzle is communicably connected to the inlet and has a constricted orifice disposed intermediate the inlet and discharge outlet of the housing. An air inductor assembly is adjustably connected to the eductor housing. The air inductor assembly includes an intake conduit having an outer end disposed exteriorly of the eductor housing for communicably connecting to a source of outside air. The inductor intake conduit also includes an inner end supporting an air induction port or nipple disposed interiorly within the eductor housing and proximate the constricted orifice of the venturi nozzle. Liquid is pumped or otherwise driven or transmitted through the eductor inlet, venturi nozzle and constricted orifice, and directed through the enlarged discharge outlet. As water or other liquid exits the constricted orifice, the venturi effect creates a vacuum that draws or suctions air through the conduit of the inductor assembly into the eductor housing, and infuses or inducts the air into the liquid flow exiting the orifice of the venturi's nozzle. Small bubbles of air are effectively entrained and absorbed by the liquid flow and discharged by the eductor with the liquid flow into the pertinent body of water or the other liquid.

In a preferred embodiment, the intake conduit of the inductor assembly may include a threaded sleeve that is adjustably mounted in a lock ring or nut secured to the eductor housing. The threaded sleeve may be raised or lowered within the eductor housing to position the discharge port of the inductor conduit at a selected height within the eductor housing relative to the venturi nozzle orifice. A tee may communicably interconnect the intake conduit to an air inlet pipe or hose that features a valve for opening and closing to respectively permit and restrict air flow through the intake conduit and thereby into the interior of the eductor housing proximate the orifice. A tee handle may be provided for turning the inductor conduit to selectively raise and lower the discharge port of the conduit within the eductor housing.

BRIEF DESCRIPTION OF THE DRAWINGS

Other objects, features and advantages will occur from the following description of a preferred embodiment and the accompanying drawing, in which.

DETAILED DESCRIPTION OF PREFERRED EMBODIMENTS

Figure 1:
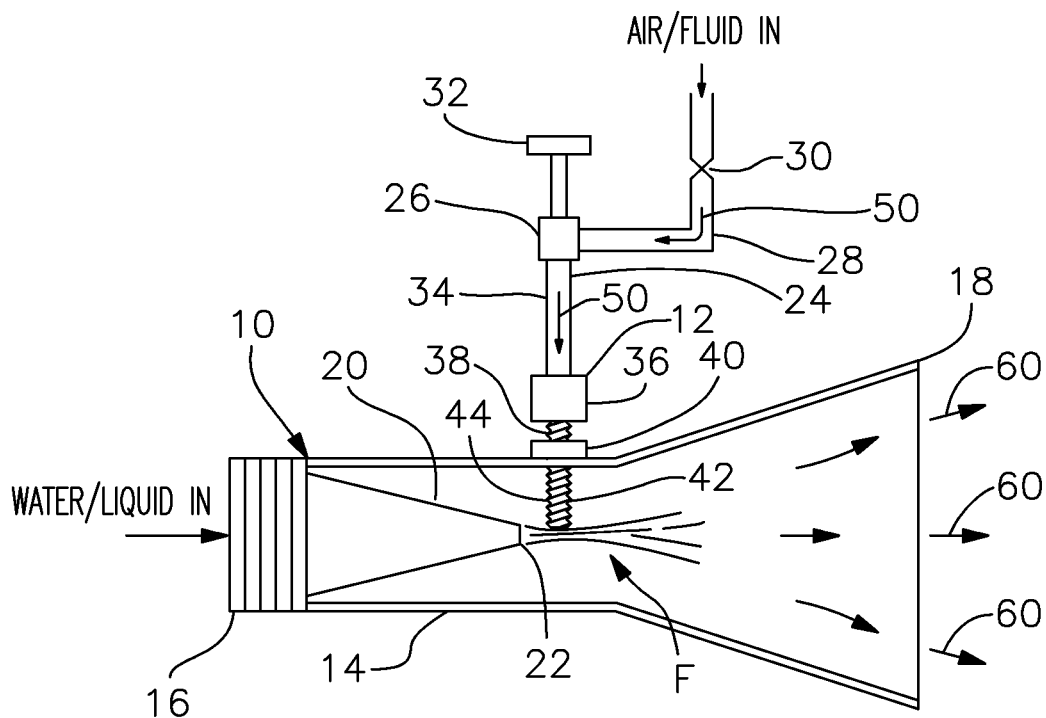
FIG. 1 is a schematic side view of an aerating eductor employing an adjustable air induction system in accordance with this invention.

There is shown in FIG. 1 an aerating eductor 10 having an adjustable air induction assembly 12 integrated therewith. Eductor 10 includes an eductor housing 14 having a threaded inlet end 16 at one end of housing 14 and an enlarged discharge end 18 at the opposite end of the housing. Inlet 16 includes threads (which may be either interior or exterior) for interconnecting to a pipe or conduit (not shown), which delivers water or other forms of liquid to eductor 10. The eductor typically delivers water in a flow to a body or contained volume of water such as a lake, pond, water storage tank or swimming pool. The contained volume of water can also include an aquarium, fish tank or other tank or container holding marine life. It should be understood that the environment in which the eductor is used is not a limitation of the invention. Eductor 10 may be employed in a wide variety of applications and environments in accordance with this invention.

Eductor 10 includes a venturi nozzle 20 that is communicably connected to inlet 16. Venturi nozzle 20 includes a constricted orifice 22 that is held within eductor housing 14 between inlet 16 and discharge outlet 18. The eductor housing 14 and venturi nozzle 20 may have alternative configurations and orientations from that which is shown.

Adjustable inductor assembly 12 includes a pipe, hose or other type of conduit 24. A tee 26 communicably interconnects conduit 24 to an intake hose 28, which is, in turn, connected to an outside air source. The air source may include ambient atmosphere air or a pressurized air supply. A valve 30 may be selectively opened and closed to respectively allow and restrict the introduction of air through intake hose 28 and tee 26 into conduit 24. A handle 32 may be secured to tee 26 for selectively turning and positionally adjusting the eductor assembly 12 in a manner that is described more fully below.

Figure 2:
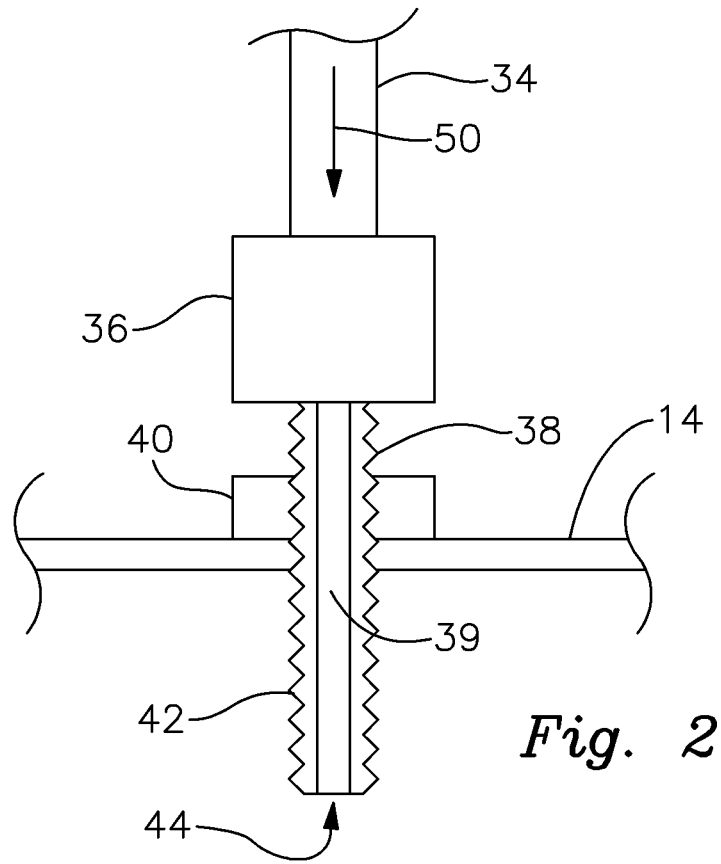
FIG. 2 is an elevational, partly cross sectional view of the tubular sleeve of the air induction system as adjustably interengaged with the eductor.

Conduit 24 features a pipe segment 34 that is communicably interconnected by a cylindrical coupler 36 to the upper end of an exteriorly threaded, tubular sleeve 38 shown in cross section in FIG. 2. Sleeve 38 includes a passageway 39 for transmitting air therethrough. The threaded tubular sleeve is, in turn, threadably and adjustably interengaged with an internally threaded nut or lock ring 40. The lock ring is itself secured to an outer surface of eductor housing 14. A corresponding hole in housing 14, which itself may be internally threaded, receives exteriorly threaded sleeve 38 such that a lower segment 42 of sleeve 38 extends interiorly into housing 14. The distal lower end of sleeve segment 42 comprises an air induction port or nipple 44, which in FIG. 1 is shown positioned proximate the constricted orifice 22 of venturi nozzle 20.

Eductor 10 is assembled by interengaging inductor assembly 12 with eductor housing 14 and adjusting the inductor assembly so that air induction nipple 44 is positioned at a selected height relative to water discharge orifice 22. Specifically, sleeve 38 is threadably engaged with lock ring 40 and handle 32 is turned in either a clockwise or a counterclockwise direction to respectively lower/extend or raise/retract air induction nipple 44 through the eductor housing until the nipple is positioned at a desired height within housing 14 proximate orifice 22. Air intake hose 28 is connected to the exterior air source and valve 30 is opened. Hose 28 can be disconnected from tee 26 to facilitate turning handle 32 and conduit 24.

In operation, valve 30 is opened to allow air to flow freely through conduit 24 from the exterior air source. Water or other liquid is driven or otherwise transmitted through venturi nozzle 20 and exits orifice 22. This creates a low pressure venturi effect within eductor housing 12, which draws air through both conduit 24 and passageway 39 of communicably attached tubular sleeve 38. This air is suctioned or drawn into the low pressure zone within eductor housing 14 through air induction port or nipple 44 of assembly 12. The suctioned air is thereby pulled, absorbed or otherwise entrained by or into the fluid (water) flow F within the eductor housing. This aerates and oxygenates the water and increases the turbulence of the water flow. As a result, an aerated water flow is discharged from the eductor as indicated by arrows 60.

Figure 3:
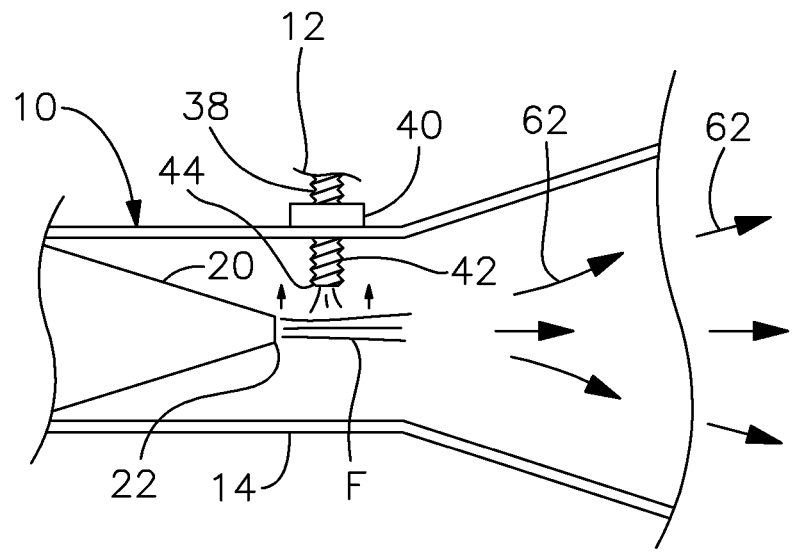
FIG. 3 is a schematic side view of the eductor with the adjustable air induction port positioned above the eductor orifice.

In FIG. 3 the air induction tubular sleeve segment 42 is shown raised slightly above the constricted discharge orifice 22 of venturi nozzle 20. The sleeve segment and nipple 44 (constructed analogously as shown in FIG. 2) are elevated or retracted into this position (from the position shown in FIG. 1) by turning handle 32 in a clockwise direction. Because nipple 44 of air inductor assembly 12 is elevated somewhat above the liquid flow F in FIG. 3, a different degree of air entrainment, and resultant aeration/oxygenation and turbulence, is achieved. Nonetheless, the aerated water is again discharged by eductor 10 as indicated by arrows 62 into a downstream body or otherwise contained volume of water.

Figure 4:
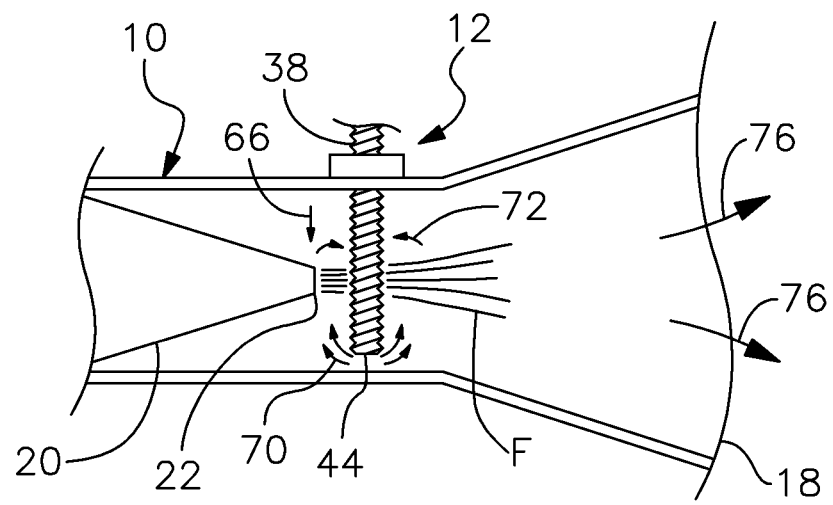
FIG. 4 is a schematic view of the eductor with the air induction port positioned below the orifice to produce a plume of air surrounding the flow of water through the eductor.

In FIG. 4, threaded sleeve 38 is extended or lowered in the direction of arrow 66, again by turning the handle of assembly 12 (e.g. clockwise), until the nipple 44 of tubular sleeve 42 is disposed below constricted orifice 22 of venturi nozzle 20. The venturi effect caused by water flow F discharged from orifice 22 creates at least a partial vacuum, which draws or sucks air through conduit 24 and out of nipple 44, as indicated by arrows 70. As further indicated by arrows 72 a plume of air is formed around water flow F, such that oxygen is entrained and absorbed by flow F and then discharged from enlarged discharge end 18 of eductor 10 as indicated by arrows 76. In swimming pool applications, an especially turbulent water flow may be generated. Eductor 10 can be placed within the pool such that is it directed toward the side walls and floor of the pool. The turbulent flow produced by the eductor helps to more effectively clean dirt and debris from the side and floor surfaces of the pool and direct such material toward the pool return(s) for removal by the pool filter.

Figure 5:
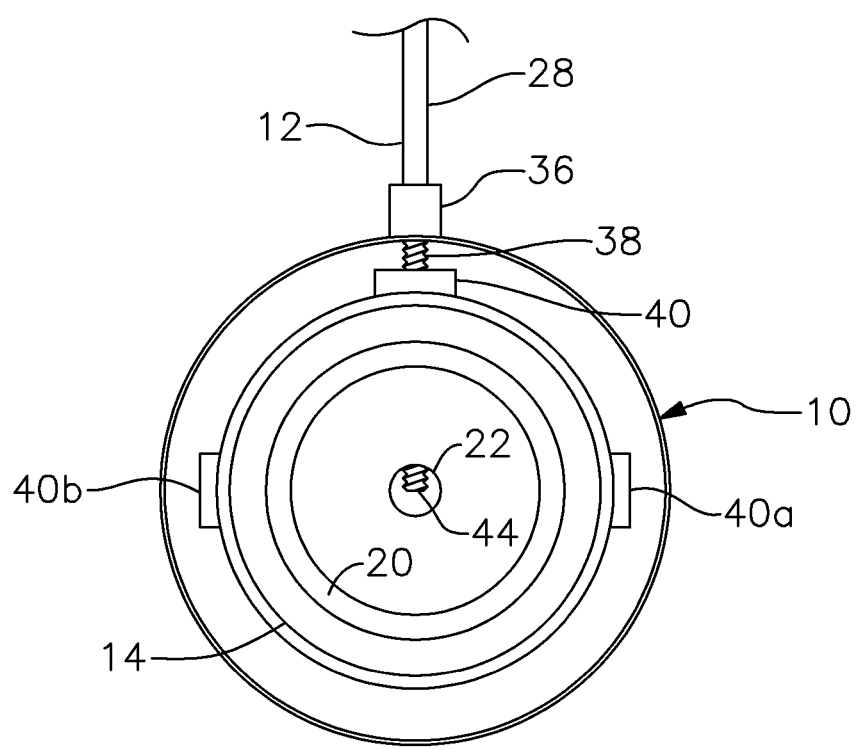
FIG. 5 is a cross sectional end view of the eductor and air induction assembly and depicting several alternative locking ring positions that permit the air induction system to be connected to the eductor housing at different respective angular orientations.

As shown in FIG. 5, additional lock rings 40a and 40b may be formed at other angular orientations about the surface of eductor housing 14. This permits the air inductor 28 and air induction nipple 44 to be positioned at different locations within the eductor 10 in order to achieve various respective aeration, turbulence and flow characteristics. Alternative numbers and placements of lock rings F and nuts, or other means for adjustably securing the air inductor assembly to the eductor may be employed. It should also be noted that various other numbers and configurations of air inductor assemblies may be utilized. For example, in FIG. 4, two or three air inductor assemblies 12 may be employed, with each such assembly adjustably attached to a respective one of lock rings 40a, 40b and 40c in a manner identical or similar to that described above.

The tubular sleeve 38 and lock, ring or nut 40 may be adjustably interengaged with one another and operably and cooperatively interengaged with eductor housing 14 in the manner shown in FIG. 2 or in alternative ways within the scope of this invention. For example, the nut or lock ring may be formed integrally or unitarily with the eductor housing. The tubular sleeve or air induction conduit may be slidably or otherwise longitudinally adjustably mounted to the eductor to permit convenient repositioning of the air induction port or nipple within the eductor housing and relative to orifice 22 of venturi nozzle 20. The exteriorly threaded tubular sleeve disclosed herein in particularly effective in holding the air induction port securely in place during the air induction process. The air induction port or nipple itself may include various types and configurations of discharge openings suited for effectively inducting air or other fluid into the low pressure zone produced when water or other liquid is, driven through the venturi nozzle.

Alternative mechanisms may be employed for longitudinally adjusting conduit 24, and, as a result, adjusting the position of air induction nipple 44 within eductor housing 14. Mechanical and electrical devices may be utilized to adjust such positions either manually or automatically within the scope of this invention. This provides for precise operator control of the oxygenation and turbulence produced by the eductor. As a result, the system may be employed in various aquatic environments such as swimming pools, potable water supplies, retention ponds, water holding tanks and marine life tanks to perform desired functions including, but not limited to oxygenation, algae control, pool cleaning and filtration.

Eductor 10 and the positionally adjustable integrated air inductor assembly 12 provide for significantly improved aeration and liquid flow turbulence. Each air inductor assembly can be precisely adjusted, for example by turning its respective handle 32 either clockwise or counterclockwise to respectively extend and retract the air inducting nipple or other type of port within housing 14 of eductor 10. A very precise positional adjustment is provided so that a corresponding desired amount of aeration and turbulence is produced as the liquid flows through eductor 10.

The aerating eductor of this invention yields a number of significant benefits. The device produces aeration and oxygenation at levels that satisfactorily support fish and marine life in various environments including, but not limited to aquariums, tanks, ponds, etc. The eductor can also be used quite effectively for aerating water storage tanks and other potable water supplies to significantly reduce the growth of algae, bacteria and germs that often occurs in otherwise stagnant water.

The eductor greatly reduces the need for using pumps, sprayers and other conventional equipment commonly used to aerate and oxygenate water. In turn, this reduces the cost, time, maintenance and inconvenience that usually accompany the use of such equipment. By properly adjusting inductor assembly 12, the user can produce a flow that is sufficiently turbulent to help clean pool and spa surfaces (especially in restricted or hard to reach areas such as steps and corners) and to forcefully direct dirt and debris toward the recirculating return and filter of the pool/spa. This reduces the need to regularly brush and vacuum the pool surfaces and the attendant inconvenience, labor and cost associated with such pool maintenance tasks. The air inducted flow can also be used successfully to produce opposing currents for fish or swimmers in respective bodies of water. Moreover, it can produce various different current effects, improved temperature controls, and effective disbursement of chemicals in both aquariums and marine life tanks, as well as in restricted areas of a swimming pool.

In alternative embodiments, liquids other than water may be driven through the eductor. Likewise, gases other than air may be selectively inducted into the driven fluid. Indeed, in some embodiments the inductor assembly may be connected to an outside source of liquid that includes chemicals or nutrients that can be drawn into the eductor by the liquid flow and disbursed into a body or other contained volume of water or other liquid. In this manner the eductor can be used to effectively treat the water or other liquid supply. In such versions, the eductor employs a liquid inductor assembly analogous to assembly 12 described above.

Accordingly, the present invention relates to an eductor device utilizing an adjustable assembly for inducting air or another gaseous substance into water or other liquid being transmitted through the eductor in a manner that enables the liquid discharged from the eductor to achieve a selected degree of aeration, oxygenation and/or turbulence.

Although specific features of the invention are shown in some of the drawings and not others, this is for convenience only, as each feature may be combined with any and all of the other features in accordance with this invention,

What is claimed is:

1. An aerating eductor device comprising:
an eductor housing that includes an inlet for introducing liquid into said eductor housing and an enlarged discharge outlet, which is wider than said inlet, for discharging the liquid from said eductor housing;
a venturi nozzle communicably connected to said inlet and extending through said eductor housing, said venturi nozzle including a constricted orifice disposed within said eductor housing intermediate said inlet and said discharge outlet; and
an adjustable air inductor assembly operably attached to said eductor housing, said air inductor assembly including an elongate air intake conduit that is interengaged with and longitudinally adjustable through a complementary receptacle attached to said eductor housing, said air intake conduit having an outer section for communicably connecting to a source of air outside of said eductor housing and an inner section communicably connected to said outer section and supported interiorly within said eductor housing, said inner section of said air intake conduit having an air induction port proximate and positionally adjustable with respect to said constricted orifice of said venturi nozzle;
liquid being introduced into said eductor housing and driven through said constricted orifice of said venturi nozzle past said air induction port to produce a suction that draws air into said eductor housing through said induction port, whereby the liquid is aerated prior to being discharged through said eductor outlet; said air intake conduit being longitudinally and selectively adjustable through said receptacle to position and hold said air induction port at a selected height within said eductor housing and at a selected proximity to said orifice for controlling the turbulence and aeration of liquid discharged through said eductor outlet.

2. The device of claim 1 in which said intake conduit includes an exteriorly threaded sleeve that may be selectively extended and retracted through a complementary threaded receptacle attached to said eductor housing to position said induction port at a selected location within said eductor housing relative to said venturi nozzle orifice.

3. The device of claim 2 in which said adjustable inductor assembly further includes a tee that communicably interconnects said intake conduit to an air inlet line, which air inlet line is connected to the air source.

4. The device of claim 3 further including a tee handle for turning said intake conduit to selectively extend and retract said induction port of said intake conduit through said eductor housing.

5. The device of claim 1 in which said threaded sleeve is interengaged with and longitudinally adjustable through a complementary threaded nut attached to and communicating with an interior of said eductor.

6. An aerating eductor device comprising:
a generally cylindrical eductor housing that includes an inlet for introducing liquid into said eductor housing and an enlarged discharge outlet, which is wider than said inlet, for discharging the liquid from said eductor housing;
a venturi nozzle communicably connected to said inlet and extending through said eductor housing, said venturi nozzle including a constricted orifice disposed within said eductor housing intermediate said inlet and said discharge outlet; and
a plurality of adjustable air inductor assemblies operably attached to and radially spaced apart about said eductor housing, each said air inductor assembly including an elongate air intake conduit that is interengaged with and longitudinally adjustable through a complementary receptacle attached to said eductor housing, said air intake conduit having an outer section for communicably connecting to a source of air outside of said eductor housing and an inner section communicably connected to said outer section and supported interiorly within said eductor housing, said inner section of said air intake conduit having an air induction port proximate and positionally adjustable with respect to said constricted orifice of said venturi nozzle;
liquid being introduced into said eductor housing and driven through said constricted nozzle of said venturi nozzle past said air induction port to produce a suction that draws air into said eductor housing through said induction port, whereby the liquid is aerated prior to being discharged through said eductor outlet; said air intake conduit being longitudinally and selectively adjustable through said receptacle to position and hold said air induction port at a selected height within said eductor housing and at a selected proximity to said orifice for controlling the turbulence and aeration of liquid discharged through said eductor outlet.

7. The device of claim 6 in which said air intake conduit of each said air inductor assembly includes an exteriorly threaded sleeve that is interengaged with and longitudinally adjustable through complementary interior threads of said receptacle attached to said eductor housing.

8. The device of claim 7 in which said sleeve may be selectively extended and retracted within said eductor housing to position a corresponding said air induction port at a selected location within said eductor housing relative to said venturi nozzle orifice.

9. The device of claim 8 in which said adjustable air inductor assembly further includes a tee that communicably interconnects said air intake conduit to an air inlet line, which air inlet line, which liquid inlet line is connected to the air source.

10. The device of claim 9 further including a tee handle for turning said air intake conduit to selectively extend and retract said air induction port of said air intake conduit through said eductor housing.

11. The device of claim 6 in which said air intake conduit of each said adjustable, air inductor assembly includes a threaded sleeve that is interengaged with and longitudinally adjustable through a complementary threaded nut attached to and communicating with an interior of said eductor housing.

12. A liquid transmitting eductor device comprising:
- an eductor housing that includes an inlet for introducing liquid into said eductor housing and an enlarged discharge outlet, which is wider than said inlet, for discharging the liquid from said eductor housing;
- a venturi nozzle communicably connected to said inlet and extending through said eductor housing, said venturi nozzle including a constricted orifice disposed within said eductor housing intermediate said inlet and said discharge outlet; and
- an adjustable fluid inductor assembly operably attached to said eductor housing, said fluid inductor assembly including a fluid intake conduit that has an outer section communicably connected to a source of fluid outside of said eductor housing and an inner section communicably connected to said outer section and supported interiorly within said eductor housing, said inner section of said fluid intake conduit having a fluid induction port proximate and positionally adjustable with respect to said constricted orifice of said venturi nozzle; said fluid intake conduit of said inductor assembly including an exteriorly threaded sleeve that is interengaged with and longitudinally adjustable through a complementary interiorly threaded receptacle attached to said eductor housing;
- liquid being driven through said eductor housing and said constricted nozzle of said venturi nozzle, and past said fluid induction port to produce a suction that draws fluid into said eductor housing through said induction port, whereby the liquid is inducted by the fluid prior to being discharged through said eductor outlet.

13. The device of claim 12 in which said sleeve may be selectively extended and retracted within said eductor housing to position said fluid induction port at a selected location within said eductor housing relative to said venturi nozzle orifice.

14. The device of claim 13 in which said adjustable fluid inductor assembly further includes a tee that communicably interconnects said fluid intake conduit to a fluid inlet line, which fluid inlet line is connected to the fluid source.

15. The device of claim 14 further including a tee handle for turning said fluid intake conduit to selectively extend and retract said fluid induction port of said fluid intake conduit through said eductor housing.

16. The device of claim 12 in which said fluid intake conduit of said adjustable fluid inductor assembly includes a threaded sleeve that is interengaged with and longitudinally adjustable through a complementary threaded nut attached to and communicating with an interior of said eductor housing.

* * * * *